United States Patent
Balog

[19]

[11] Patent Number: 6,106,912
[45] Date of Patent: Aug. 22, 2000

[54] EMBLEM MOUNTING ASSEMBLY

[76] Inventor: Leonard John Balog, 3887 Midshore Dr., Naples, Fla. 34109

[21] Appl. No.: 09/316,567

[22] Filed: May 21, 1999

Related U.S. Application Data

[60] Provisional application No. 60/088,324, Jun. 4, 1998.

[51] Int. Cl.[7] .................................................. B60R 13/04
[52] U.S. Cl. .............................. 428/31; 40/591; 280/727
[58] Field of Search .................................. 428/31; 40/591; 280/727

[56] References Cited

U.S. PATENT DOCUMENTS

| | | | |
|---|---|---|---|
| D. 242,786 | 12/1976 | McAvin | D12/199 |
| D. 255,562 | 6/1980 | Szperkowski | D12/197 |
| D. 280,807 | 10/1985 | Kaiser | D12/197 |
| 2,632,269 | 3/1953 | Sanders | 40/125 |
| 4,349,591 | 9/1982 | Kanamori | 428/31 |
| 4,783,352 | 11/1988 | Kaiser, Jr. | 428/31 |
| 4,891,252 | 1/1990 | Kaiser, Jr. | 428/31 |
| 4,988,065 | 1/1991 | Leban et al. | 248/181 |
| 5,178,920 | 1/1993 | Stone | 428/31 |
| 5,413,826 | 5/1995 | Klonikowski | 428/31 |
| 5,549,940 | 8/1996 | Noone | 428/31 |

*Primary Examiner*—Alexander Thomas
*Attorney, Agent, or Firm*—Gordon H. Telfer

[57] ABSTRACT

An assembly has a base of elastomeric material and a frame for an emblem or ornament. A fastener portion of the frame fits with a stem portion of the base in fixed relation. The base is secured to a surface, such as a vehicle hood, by an adhesive, with no elements through the attachment surface being required. The base is elastic to yield to anticipated forces, such as due to wind, automatic car washes, and manual pulls or pushes, and to return to its intended position, without disturbing the adhesive bond. Base designs include having a stem at an angle to a normal to the base bottom or mounting surface; the amount of such angle being determined to make the emblem be presented in an upright or moderately canted back, position when the assembly is installed on any of a number of vehicles having a range of hood slopes; so that substantially all vehicles and hood slopes in use can be fitted with one of only a small number of base configurations. Economy of construction and ease of installation, including a method that gives an ordinary user correct alignment and orientation, enhances usability of the assembly. Emblems may be selected from a wide variety including some that are replaceable or allow placing a new one on a prior one. The same frame emblem support can also serve, without the fastener portion, as a separate ornamental item, such as a pendant, that can be coordinated with that on a vehicle.

17 Claims, 3 Drawing Sheets

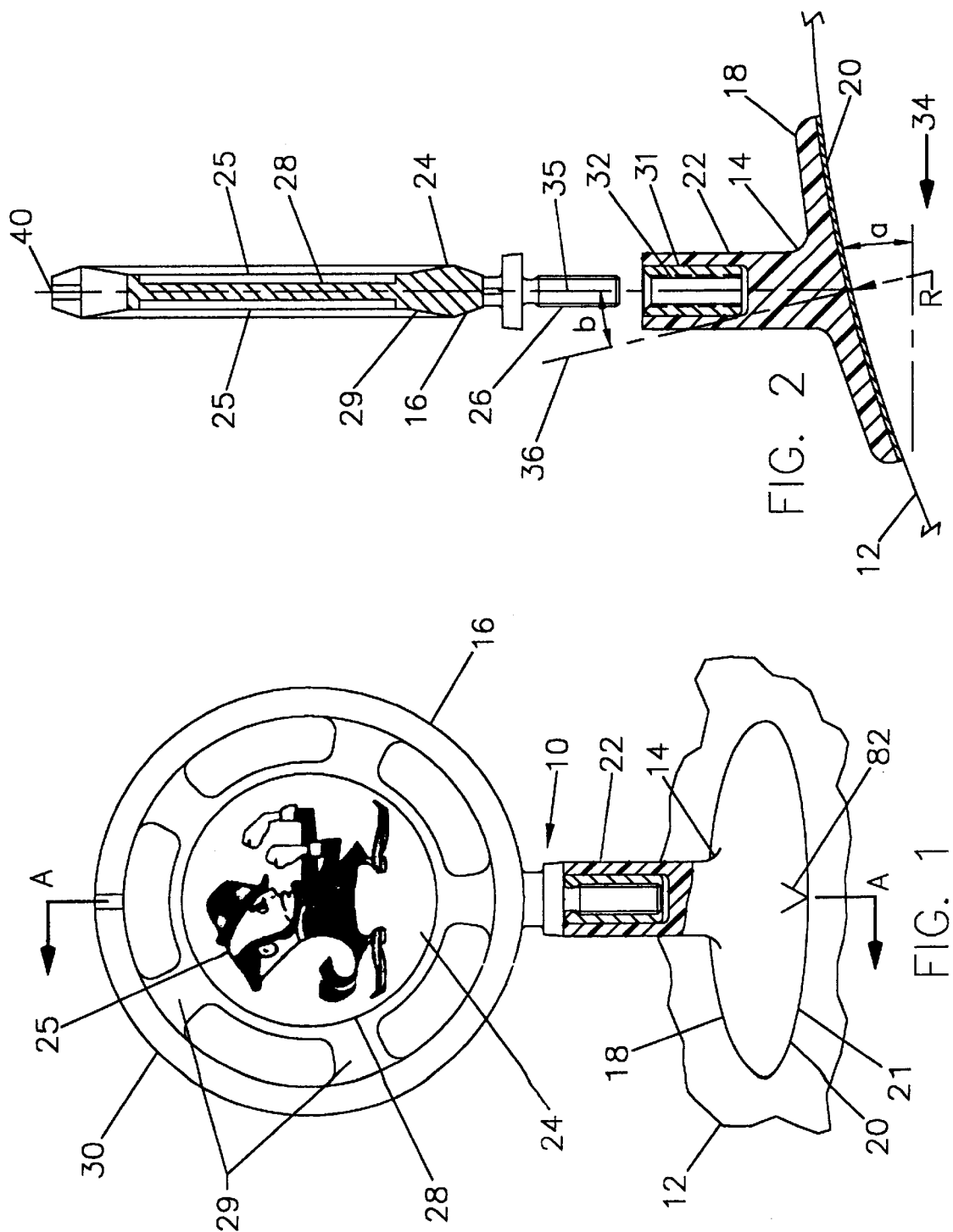

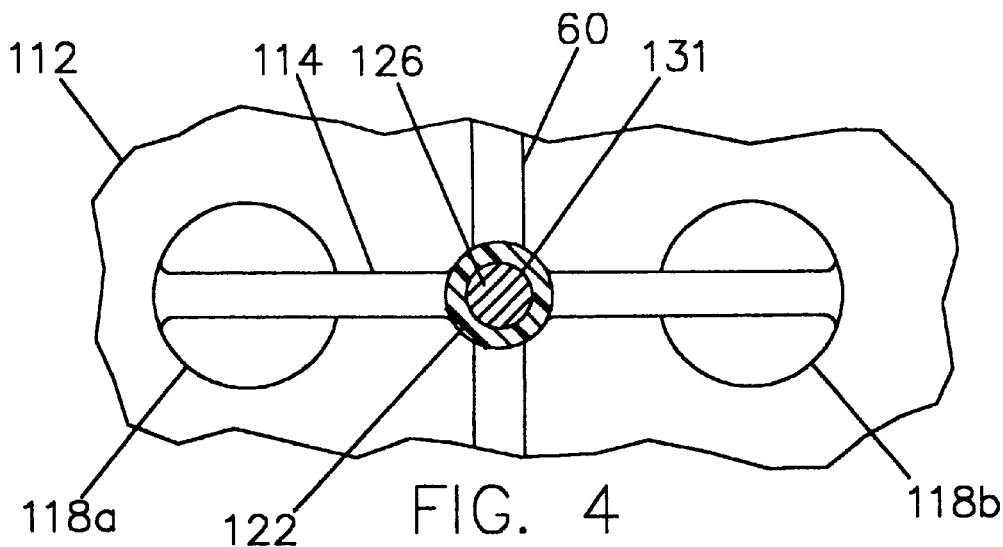
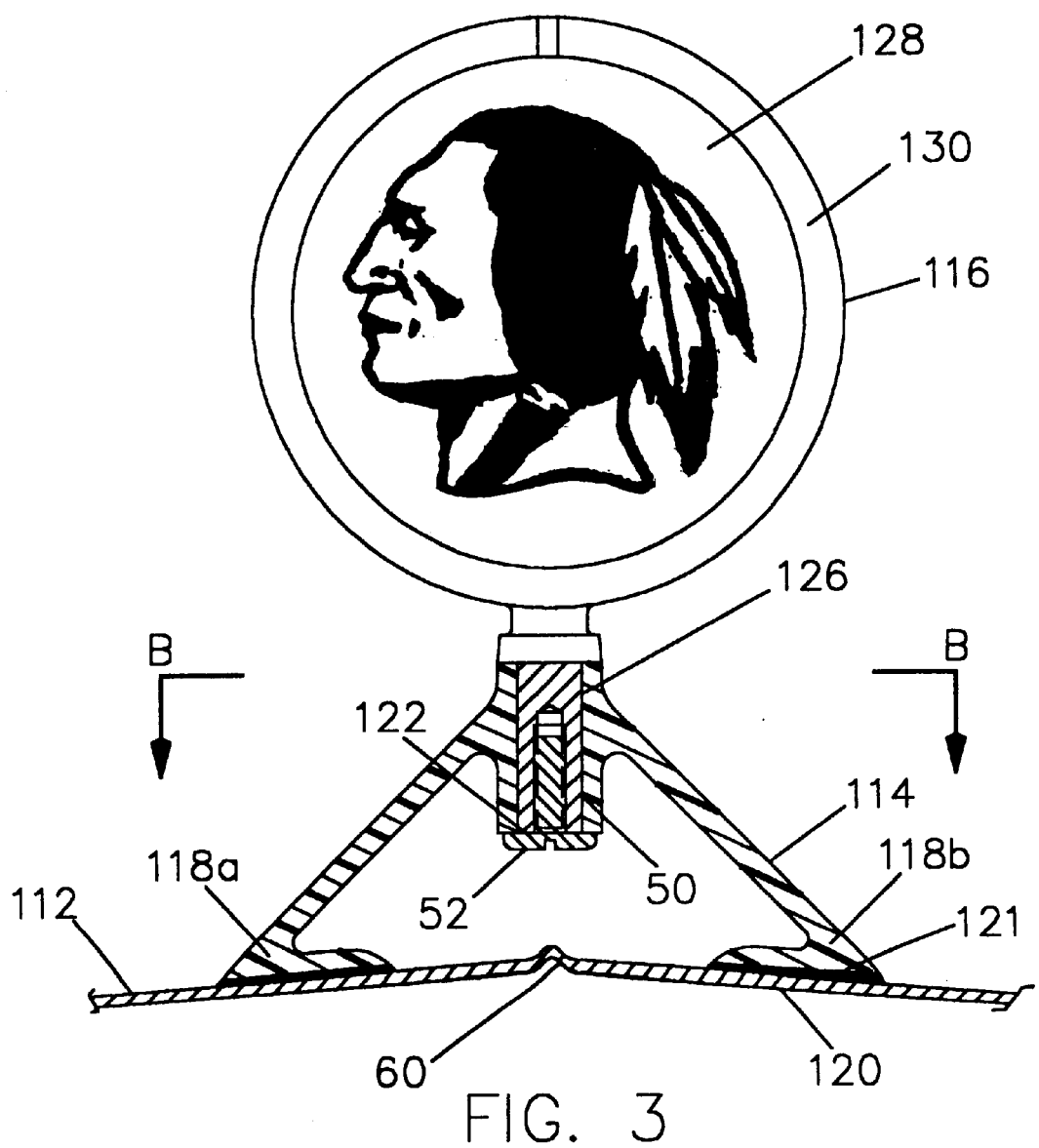

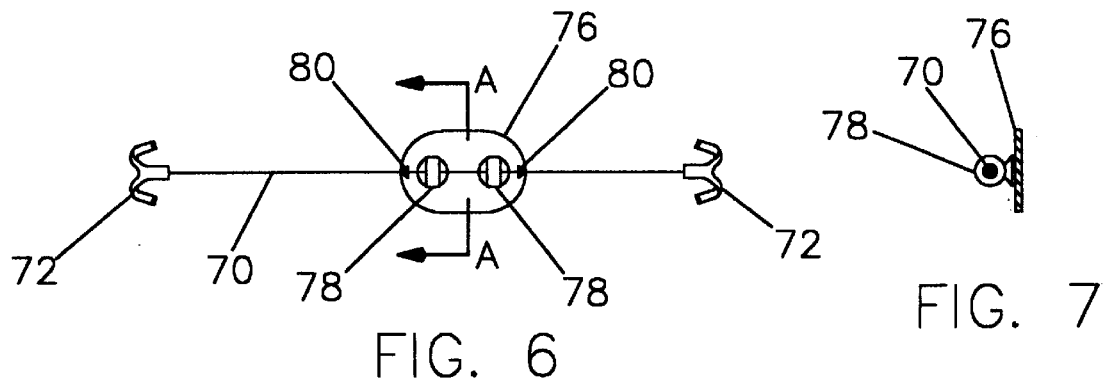
FIG. 6
FIG. 7
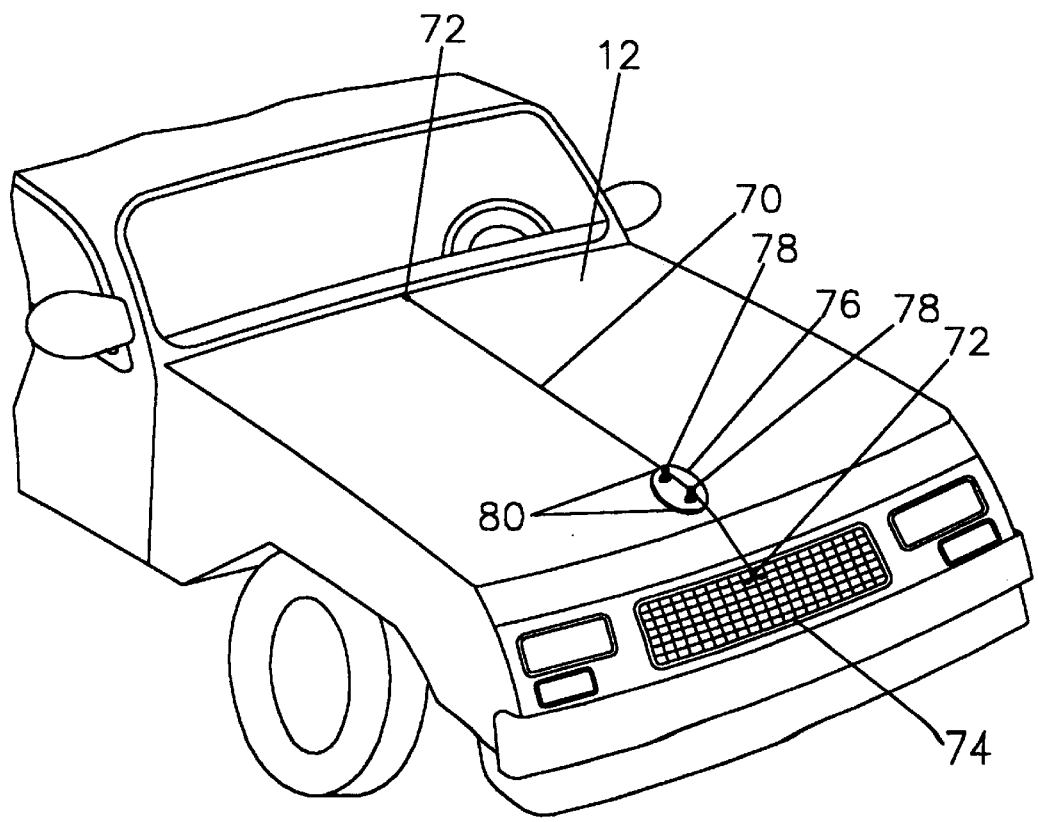
FIG. 5

EMBLEM MOUNTING ASSEMBLY

RELATED PROVISIONAL APPLICATION

This application claims the benefit of provisional application for patent, Ser. No. 60/088,324, filed Jun. 4, 1998, by the present inventor, entitled "Personalized Vehicle Hood Emblem and Complementary Accessories".

TECHNICAL FIELD

This invention relates to assemblies mountable on a structure, such as a vehicle hood, to display an emblem, particularly as an after-market item easily installed by a consumer.

BACKGROUND OF THE INVENTION

Auto hood ornaments were widely used in a previous time, frequently to display auto manufacturers' emblems. Their use has declined in recent decades. Hood ornaments that are applied in the original manufacture of vehicles have been secured by a type of assembly that penetrates the hood and is often characterized by having a number of parts and structure that incurs relatively large manufacturing cost. Kanamori patent 4,349,591, Sep. 14, 1982, shows some examples of ornament assemblies, some of which use an elastically deformable synthetic resin for some elements to make them yieldable. Such assemblies still rely on parts penetrating the hood to secure them.

Examples of other prior art showing the relative complexity of prior assemblies are Leban et al. patent 4,988,065, Jan. 29, 1991, and Stone patent 5,178,920, Jan. 12, 1993. It is clearly not favorable to wide use by consumers for complex assemblies or any assemblies requiring new hood apertures to be provided in the vehicle parts aftermarket.

More simple assemblies have been proposed but are not believed to achieve satisfactory durability, security, and other desired qualities. Sanders patent 2,632,269, Mar. 24, 1953, discloses a stick-on advertising device of a semi-rigid sheet material such as relatively thin cardboard. Such a structure would, at best, have very temporary utility.

Kaiser patent 4,783,352, Nov. 8, 1988, discloses a thermometer for mounting on a vehicle. The base of the mounting assembly is glued and/or bolted to the hood. The base is a synthetic material, such as PVC, which is intended to be rigid but with enough elasticity for placing a metal ball, supporting the thermometer, into a socket of the base. It is apparent the base is not intended to have appreciable elasticity in use, e.g. to absorb external deflection forces: if a glue alone were relied on to mount the base, without a through-bolt, it is believed the glue would bear all the stress except to the extent the ball rotates in the socket.

The Kaiser patent, and also the above-mentioned patent of Leban et al., have assemblies with ball and socket joints to allow pivoting of the thermometer, or ornamental object, to a desired position to accommodate a variety of hood slope angles. Leban et al. mentions various elastomeric materials for a bushing in which the socket for the ball or the joint is located. However, like Kaiser, that is to enable getting the ball into the socket.

A ball and socket joint is convenient for position adjustment but carries with it various drawbacks. The ball and socket depends on static friction to maintain the position set by the user. A blow that causes deflection necessitates resetting the position. Furthermore, the ball and socket is subject to separation by fairly easy reversal of the assembly process. Also, the joint is believed likely to suffer due to weather, such as by ice interfering with adjustability.

The prior art also includes recognition of the potential for mounting a "hood" ornament in some locations other than a vehicle hood and, also, a desirability for emblems other than manufacturers' emblems, represented for example by Noone patent 5,549,940, Aug. 27, 1996, showing vehicle ornamentation with sports team emblems. However, the prior art, individually and collectively, does not appear to achieve sufficient desirable qualities for an assembly that is economical and easily usable by consumers. At present, no aftermarket hood ornament assembly is known to have achieved wide application.

SUMMARY OF THE INVENTION

The invention can take a variety of specific forms as shown by the examples described below. By way of summary, among the features of the invention are that it provides a high degree of durability, safety and versatility while being relatively economical and easy to use. The assemblies of the invention have relatively few parts easily combined by a manufacturer for delivery as a single unit to a consumer for easy installation on a hood, or other location, without tools.

Embodiments include those in which a base of an elastomeric material, with appreciable elasticity, is affixed directly to a hood, or another object, by an adhesive layer. The base has a foot portion with a mounting surface having the adhesive and a stem portion extending generally up, or away from the mounting surface. The stem portion of the base is arranged in combination with an emblem support, of a more rigid material such as metal, that includes a fastener portion that fits securely with the stem of the base. The stem of the base and the fastener portion of the emblem support are securely joined together, i.e., without adjustability by a user. They can be in mutually threaded relation as by, for example, the stem containing within its elastomeric material a substantially cylindrical passage in which an elongated fastener portion of the emblem support is threaded; the stem passage having a threaded metal insert therein that receives threads of the emblem support fastener portion. The pieces are fixed together permanently by adhesive bonding and/or other means.

The base is made so the mounting surface of the foot portion and the stem portion are at a fixed angle in rotation to normal. That is, the stem is at a predetermined angle to the mounting surface which may be 90° (0° from normal) or an angle chosen (such as about 75°, or about 15° from normal) for its suitability on a hood surface that slopes to a certain extent.

What is not desired is for the base stem, which is secured to the emblem support, and the foot to be adjustable by a user such as by a ball and socket joint. Instead, the invention gives a user a fixed angle, such as one that puts an emblem in a substantially upright position when mounted on a particular hood. Even when the assembly is struck, twisted or otherwise distorted, it can be counted on to return to its original position due to the high elasticity of the material of the base, such as having a stretch characteristic of at least about 300%, along with a tensile strength of at least about 1800 pounds per square inch (psi). Among elastomeric materials suitable for use to form the base are materials such as castable or injection moldable urethane materials and thermoplastic rubber materials that meet the above elasticity and tensile strength criteria and, further, are durable over a wide temperature range, such as at least about −30° to +120° F.

Selection of the fixed angle of the stem portion of the base can be done so a single assembly unit can be applied to vehicles having a range of hood slopes. Pickup trucks generally have near 0° hood slope, cars about 10° to 15° and vans generally up to about 25°. These slopes also vary from the front to back of a hood due to hood curvature. The invention recognizes that even a flat emblem can be displayed attractively without being exactly vertical. A single chosen angle of the base stem, such as from between about 5° to about 25°, can accommodate a range of vehicle hoods by achieving a substantially upright emblem display in a range from up to about 3° of forward canting to up to about 15° of backward (toward the windshield) canting. That allows a manufacturer to make only a small number of base configurations and achieve economy for both the manufacturer and user. For example, a stem angle of about 13° is suitable for most auto hoods. Stem angles of about 7° would be suitable for pickups and other vehicles with relatively flat or slightly sloped hoods, and about 23° would accommodate highly sloped hoods on vans and some sports cars. So a good installation can be made and the elastic base will make the emblem return to the original position after a deflection force, even one that turns the emblem 90° from its original position.

Preferred units are also made with a relatively low profile base, such as one having a maximum of no more than about 1½ inches from the mounting surface to the top of the stem; this avoids having wind cause any appreciable distortion that would distract a driver. The total height of the assembly is, for example, up to about five inches, with the frame being either solid or, to lower wind resistance, vented.

The invention also includes configurations adapted for particular hood characteristics in addition to the front to back slope that is accommodated by the stem angle. Such configurations include having the base foot in two spaced portions to straddle a center crease of a hood. Also, a base foot mounting surface can be other than merely flat. There are a variety of auto hood surface configurations in use today but a substantial percentage have a rounded area in a region likely to be chosen for a hood ornament. Enhancing the conformation of the emblem assembly mounting surface to the rounded hood, while not necessarily precise, helps to achieve good securement and appearance. It has been found, for example, that a mounting surface having a spherical radius of concavity of about 165 in. conforms closely to a large number of current hood surfaces, and still is useful on flat surfaces. (That radius corresponds to a rise in the center of the base mounting surface of about 0.02 in. for a base about 2 in. across.)

The invention provides mounting assemblies that are totally non-harmful to the hood or vehicle. There is no need for any part of the assembly to penetrate the hood. An adhesive, such as a double coated acrylic foam tape and adhesive, that bonds securely to the base of the assembly and to the hood to such a degree that there is no appreciable risk of theft by anyone attempting to pull off the assembly. Yet such a mounting adhesive is suitably used even if one contemplates possible removal of the mounting assembly. One may cut through the adhesive layer with a knife or the like, without contact with the hood, and remove all but a residual layer of the adhesive that can be readily removed with no harm to the hood finish. In this way, even considering that a thief may cut through the adhesive, the loss of the emblem assembly will carry with it less risk of incurring expensive damage to the hood. (Alternatively, units can be made with a less adherent adhesive for use to temporarily display an emblem, such as a sports team emblem on game day.)

Among the favorable features of the invention are that it can be economical, easy to use, and versatile. The relative simplicity and few parts lends to moderate cost. Ease of use is aided by being amenable to mounting by ordinary consumers so it can be presented as an after-market item. requiring no specialized skill to install, while still being highly durable; the invention further includes a method of installing such an assembly using orientation markers relative to a vehicle hood centerline. The versatility of assemblies in accordance with the invention is provided by a number of characteristics: adaptability to a variety of hood surfaces or mounting in other locations; allowing users a choice of any desired emblem, not just a manufacturer's logo; and allowing easy change of the displayed emblem. The latter functions can result, in some forms of the invention, where the emblem support is adaptable to receive an emblem chosen and applied by a consumer from a wide selection.

Thus, in various ways, a hood ornament can be personalized according to a user's interests and, furthermore, the emblem displayed can match or be coordinated with complementary accessories such as a pin or pendant for wearing as costume jewelry.

These and other aspects of the invention will be more apparent by referring to the following description and the accompanying drawings.

BRIEF DESCRIPTION OF THE DRAWING

FIG. 1 is a front elevation view, partly in section, of an example assembly in accordance with the invention on a surface such as a vehicle hood;

FIG. 2 is a sectional view taken along the line A—A of FIG. 1 with some separation of parts;

FIG. 3 is a front elevation view of an alternative example and is partly in section;

FIG. 4 is a plan view, partly in section, taken along line B—B of FIG. 3;

FIG. 5 is a perspective view of part of a vehicle and user equipment for a method of installing an assembly on a hood in accordance with the invention; and FIGS. 6 and 7 show elements of FIG. 5, including a sectional view in FIG. 7.

DETAILED DESCRIPTION OF THE INVENTION

FIG. 1 shows a front view of an emblem mounting assembly 10 with its parts joined together and, further, in combination with an object 12, such as a vehicle hood, on which assembly 10 is mounted. Parts of assembly 10 are further illustrated in FIG. 2 in a side, section view.

The assembly 10 includes a base 14 and a frame 16, for supporting an emblem, that is secured to the base. The base 14 includes a foot portion 18 that has a mounting surface 20 bonded by an adhesive 21 to the hood 12. The base 14 also includes a stem portion 22 extending up from the foot 18. The foot and stem portions 18 and 22 are preferably parts of a unitary body of elastomeric material cast or injection molded to a desired shape.

The frame 16 is of a more rigid material, preferably metal, such as die-cast zinc alloy, aluminum, or stainless steel with a support portion 24 bearing an emblem 25 and also with a fastener portion 26 extending from the emblem support 24 and securely and nonadjustably joined to the stem 22 of the base 14. The frame support 24 shown includes a center part 28 bearing the actual emblem 25 (or emblems 25 on both sides) and with spokes 29 and a rim 30. However, in general, a frame support of any configuration may itself be the displayed emblem and an emblem may be any two or three dimensional figure.

No part of the base 14, frame 16, or any part of the assembly 10 needs to penetrate the hood 12. The assembly 10 is adequately secured to the hood 12 by the adhesive 21.

The fastener portion 26 of the frame 16 is securely joined with the stem 22 of the base by threaded engagement. Specifically, the stem portion 22 of the base 14 has a substantially circular passage 31 which, in this embodiment, extends only part-way through the base 14. Passage 31 includes a threaded metal insert 32 which is united with the rest of base 14 during the forming of the base. The fastener portion 26 of the frame 16 has threads that engage those of the metal insert 32. Furthermore, to make the parts more inseparable, it is preferred that the threads of the fastener portion 26 and the metal insert 32 be adhesively bonded together. That is, an adhesive (not shown), such as an epoxy resin type of adhesive of which one commercially available under the name Lock-Tite is an example, may be applied to the threads of elements 26 and/or 32 before they are threaded together. Other means for fixing the parts may be used such as a metal dowel pin through the wall of stem 22 and insert 32 into fastener portion 26.

Consequently, the assembly 10 includes no means intended for changing the angle of the stem 22, fastener portion 26, or emblem 25 in relation to the foot portion 18 and the surface 12. Adjustability of those parts, such as by a ball and socket or any hinge configuration, is not desired. With the assembly 10, an emblem 25 is intended to be displayed at a single angle relative to the hood 12. A temporary change of orientation can occur by deformation of the elastomer base 14 but the elasticity of the base will cause a return to the original orientation without manual adjustment.

FIG. 2 shows the assembly 10 as it would be applied to a hood surface having a front to back upward slope at an angle "a" of a given amount, about 13° in this example. Arrow 34 indicates the direction to the front of the hood 12. To accommodate the hood slope, the base stem 22 is formed with its centerline 35 at an angle "b" in relation to the normal to the mounting surface 20 of the base 14, represented by line 36. In this example, the stem centerline angle "b": is substantially equal to the hood slope angle "a", about 13°. That results in the assembly 10 installed on hood 12 displaying the frame 16 and emblem 25 in a vertical orientation. However, that is not a strict requirement for assemblies in accordance with the invention to be highly useful.

It has been found that an assembly 10 with a stem centerline angle "b" of about 13° will display the emblem 25 attractively on hoods having angles "a" between about 0° to about 15°. The key here is that the emblem is found to serve as an attractive display when oriented substantially vertically or canted back toward the windshield by an amount up to about 15°. A canting forward is not generally satisfactory unless limited to no more than a few degrees, up to about 3° maximum. The illustrated example (angle of about 13°) is one that is suitable for use on most pick up trucks and passenger cars on the road today.

A further example would be essentially the same but with the stem angle "b" of about 25° which would substantially match or satisfy most vans in current use and other vehicles with steeply sloped hoods. Clearly, the assembly 10 may be made with angle "b" being a specific angle to result in a specific orientation on a specific vehicle hood. However, it is to be recognized as a significant aspect of the invention that a selected angle for the stem portion 22 results in an assembly that is successful on a fairly wide range of vehicle hood slopes; and doing so simplifies and economizes in manufacture because of the limited number of necessary configurations. That is, a base unit 14 as shown in FIG. 1 with a given stem angle "b" is found to be particularly useful on hoods having a front to back hood slope angle "a" of anywhere from about "b" minus 15° to about "b" plus 3°. This is one of the characteristics that makes the invention highly suited for the vehicle parts after market. Also, a single frame configuration 16 can be used with the few different base configurations.

FIG. 2 also illustrates that the base 14 can, as an option, have a mounting surface 20 that is other than planar. Here the mounting surface has a slight concavity. FIG. 2 shows an exaggerated amount of concavity for purposes of illustration. The actual amount would be chosen to make the surface 20 conform, better than a planar surface, to rounded hoods. For example, it has been found that a curvature on a radius R of about 165 in. more closely conforms to a large number of present auto hoods (and substantially equal curvature occurs in the lateral direction as well as front to back). (Such a radius meaning that a base about 2 in. across has a center rise of about 0.02 in.) Such a base may still be used on a planar surface and may help an installer get a good adhesive seal at the edge of surface 20. Thus, the base may be designed intentionally to have a slightly greater concavity than needed to match the hood surface; the base will grab better at the outer edge of the mounting surface.

In preferred embodiments, the base 14 is of a material with a high degree of elasticity, tensile strength and durability over a wide range of temperatures. For example, the base material is formed of a member of the group consisting of urethane materials and thermoplastic rubber materials that can be formed by casting or by injection molding. Furthermore, preferred materials have an elasticity of at least about 300% without permanent deformation or rupture, a tensile strength of at least about 1800 pounds per square inch, and stability over a temperature range of at least about −30° to +120° F. Suitable materials with those qualities include urethane materials such as "Vibrathane", commercially available from Uniroyal Chemical Company, and thermoplastic rubber materials such as "Santoprene", commercially available from Monsanto. Such materials can be molded by injection molding by known techniques and may also be cast to form the desired unitary body with foot and stem portions 18 and 22.

A urethane material such as Vibrathane B600 having a Shore hardness in the range of from about 85A to 90A (about 80A to 100A being a more general preferred range) has a quite high tensile strength (more than 5000 psi) and elasticity (more than 400%) which are quite favorable.

Such materials also have good resistance to salt, oil, detergents, mild acid, ozone, and ultraviolet radiation as can be expected to assail the base over long use. It is further beneficial to paint the exposed surface of the base to prevent discoloration. For example, the base may be molded of a material to produce a chosen color, such as pewter, and painted, such as with a clear polyurethane based paint, to protect the color of the base. Additionally, the base may be painted with a selected color. The color of the base may be chosen as desired, such as to match or be coordinated with the emblem displayed or with the vehicle, and may include a single solid color or have variations such as stripes.

An example of a less preferred elastomeric material for the base is Vyram thermoplastic rubber that, at a shore hardness of 85, is highly elastic but has a tensile strength of only about 1300 psi.

The base mounting adhesive 21 may, for example, be a foam acrylic adhesive, such as VHB Tapes commercially available from the 3M Company. Adhesive 21 is bonded to the molded base 14 and would be provided to a user with a peel off paper or plastic cover, e.g. "Mylar". The adhesive layer 21 may have a thickness, such as about 0.045 in. that helps the assembly 10 to conform to the hood surface. For example, with the concave base shown in FIG. 2, such a layer of adhesive would be compressed by the periphery of the base, typically circular, to still make adhesive contact to a planar hood over substantially the entire mounting surface 20.

An additional aspect of the base 14, in some preferred forms of the invention, is that it is configured to avoid or minimize vibration or any appreciable deflection that might otherwise occur at high speed driving due to its high elasticity (although materials such as Vibrathane have excellent vibration dampening properties). The preferred base configurations include those with a foot portion 18 with a relatively low and smoothly shaped profile and a stem portion 22 that is relatively thin in cross-section, smoothly rounded, and short with respect to its total height from the mounting surface 20. For example, preferred base units 14 typically have a circular foot 18 that is about 1.5 to 2.5 inches across at its maximum diameter and is smoothly tapered in to the stem 22 which has a circular cross-section of about 0.5 in. diameter and a maximum height from the mounting surface 20 of no more than about 1½ in. , such as about 1 in. (The frame 16 may be variously dimensioned, such as about 2–3 in. diameter of the emblem support and about 1 in. for the fastener portion.) A total height up to about 5 in. is typically good for the entire assembly 10.

Among the forms the invention may take are varied ways for a relatively rigid emblem frame 16 to be joined with a relatively flexible base. Among them is that the frame fastener portion 26 may be locked in place in the passage 31 of the base stem 22 without being threaded into a threaded metal insert 32. This may be done, for example, by having an interference fit between the joined elements and, also, adhesive bonding.

Another form is shown in FIGS. 3 and 4 with features that can be used alternatively to respective features of FIGS. 1 and 2. (Some elements have reference numbers with the same last two digits as corresponding elements of FIGS. 1 and 2.) One such feature is how the frame fastener portion 126 is joined with the stem 122 of the base 114. Here, the frame fastener 126 fits in a stem passage 131 without threaded engagement but, preferably, with an interference fit and adhesive bonding. Furthermore, the lower end of this fastener portion 126 has a threaded aperture 50 that receives a threaded fastener or bolt 52 that has its head bearing against the underside of the stem 122. Adhesive bonding may also be used on the bolt 52.

Another feature of FIG. 3 is to show the emblem mounting portion 128 of the frame 116 can extend out substantially over the whole surface to a rim 130.

Also, FIGS. 3 and 4 show how the invention can be adapted for hoods 112 having a center crease 60 by having base 114 divided to have two foot portions 118a and 118b that are adhesively bonded on respective sides of the crease 60 as shown in FIG. 4. Other considerations, such as front to back slope, can be satisfied as it was in FIG. 2. While FIGS. 3–4 shows an example of how a base 114 can be varied from base 14 of FIGS. 1–2, it should be recognized that a single circular base 14 may also be used on a hood with a crease as long as sufficient adhesive contact can be made; or the base bottom surface may be shaped by a groove to fit the crease in the hood. Also, a divided base 114 can be used on surfaces without a crease. Additionally, a base may have additional foot portions, such as four, supporting the stem portion and bonded to the hood or other surface.

In a base generally shaped like base 14 of FIGS. 1 and 2, there can be a passage that extends through the entire stem and foot portions, and the passage wall can have an internal shoulder facing down. Thus formed, a frame fastener portion can be inserted in the passage and secured by a bolt whose head bears against the shoulder, substantially similar to the attachment technique of FIGS. 3–4.

Other forms the base can take is to have a substantially conical outer surface with a stem portion passage for joining the frame fastener portion that extends into the top of the conical shape. Securement of the frame fastener portion by any of the means described can be employed. For example, adapting the technique of FIG. 3, the stem portion of such a base is initially accessible from the bottom allowing completion of assembly with the frame. The base mounting surface extends around the bottom periphery of the conical shape.

Installation of an assembly 10, or any of its variations, is relatively straight forward and can be performed by a person without special expertise or tools. The user basically just needs to remove the peel off cover on the base mounting adhesive 21 and place it on a surface in whatever orientation and location is desired. Preferably, the user should clean and dry the surface to make sure it is free of wax or grease; a 50% alcohol in water solution may be used. Preferred adhesives bond quickly so adjustments after initial placement should not be expected.

Factors may warrant extra care to be taken in installing the assembly on a vehicle hood. A flat, two-sided emblem display would normally be placed on the hood centerline with the displayed emblems perpendicular to that centerline. Additionally, with an assembly 10 having an angled stem 22 to accommodate a sloping hood, it is desired to have the slope angle (e.g., angle "b" in FIG. 2) lined up with the hood centerline. These desired results can possibly be achieved by merely visually orienting the base, but greater certainty of getting installation in the correct location and orientation can be achieved by using a method according to the following description.

The preferred method of installing includes first identifying the centerline of the hood (i.e., locating and marking in some fashion), then positioning a template of the base on the centerline at a desired location (subject to personal choice, typically as far forward as it can be and still be visible by the driver of the vehicle to the extent he/she desires), the template having one or more orientation markers of front and/or back orientation that can be aligned with the hood centerline; then the base of the emblem mounting assembly, also having one or more markers of front and/or back orientation, is placed with its orientation markers aligned with those of the template, and then bonded to the hood surface.

Identifying the hood centerline may be performed in a number of ways including measuring the hood side to side at the back (or windshield) and at the front (or grill) and using a flexible ruler to draw (with an easily erasable marking pen) a line between the back and front centers. It is believed easier and quicker if the centerline is identified by fastening (such as by easily removed plastic clips or tape) an elastic strip of material to the points at the centers of back and front of the hood.

Referring to FIGS. 5–7, there is shown an example of carrying out the method with a line and template that can be easily supplied to persons along with the assembly 10, for installing it accurately. An auto with a hood 12 is shown with its centerline identified by an elasticize line 70 placed in center position by eye or by measurement. Line 70 is temporarily held in place by plastic clips 72 (see FIG. 6) hooked to the hood or adjacent parts, such as the grill 74. A template 76, e.g. a piece of flexible cardboard or synthetic material, is slidably joined with line 70 by loops 78 that extend up from the main part of the template. The line 70 runs through the loops 78 and the template 76 can be slid along the line to any desired position for the assembly 10.

When the template is in a desired location, the installer marks the hood at notches or clefts 80 at the front and back of the template 76. The marks can be easily erasable. After the marks are made, the hooks 72 are unfastened and the line 70 and template 76 removed from the car. Then the assembly 10 is placed with one or more front and back orientation markers, such as V mark 82 in FIG. 1, oriented with the marks made at the markers 80 of the template 76.

Easy instructions can be included for consumer installation. Besides the directions for alignment, other instructions will include cleaning the hood surface, removing the tear off cover of the mounting adhesive, applying proper pressure, and indicating proper temperature range and curing time.

In its broader aspects, the assemblies of the invention may be mounted in locations other than vehicle hoods, such as trunk decks, boat decks, dash boards, rear seat backs of vehicles or nonvehicle locations such as office desks. Positioned on a rear trunk or seat back, a form of the invention could have a light wired to be illuminated either continuously or otherwise, such as with application of the brake.

Applications include use of an assembly of the invention, personalized for the user, as a replacement of a manufacturer's hood ornament.

Emblems displayed may include any commonly recognized or personalized symbols, logos, images, caricatures, etc. Commercial goods or various organizations may be represented, a major interest being to display sports teams emblems. (Any use of established sports team emblems herein is merely for example purposes and no implication is intended that such emblems may be used in embodiments of the invention without consent of the organizations they represent.) Personalized emblems may include images of persons or pets.

In general, it is preferred, but not required, that the frame be of the substantially flat configurations shown in the drawings. That is relatively easy to make by die casting and provides a two-sided structure for application of chosen emblems, which may be the same or different emblems on the two sides. Among ways to make and apply the emblems are to have printed emblems applied by adhesive to the frame and covered by a weather protective polyurethane layer. Adhesive backed emblems of a suitable type can be obtained, for example, from the Dec-O-Art Co. Their use can include replacement by a user. For example, the emblem can be pried off with a pen knife and a new one placed on the emblem support or, in some cases, a new emblem can be applied on top of an existing one. Such an emblem may be applied to a frame emblem support 24 formed without a fastener portion, and used as an article of jewelry (pendant, etc.) or otherwise displayed separately or in coordination with a vehicle emblem mounting. By way of example, FIG. 2 shows an aperture 40 at the top of the frame 16 for a bezel and pendant chain. Also, emblems may be of diestruck metal, such as brass, and fastened (e.g., rivets, screws, solder or adhesive) to the frame.

Frames can be of a variety of metals suitable for diecasting and bronze or chrome plated or of anodized aluminum. Some may be selectively enamelized to make them more attractive for use. A variety of shapes may be used besides the circular frame emblem supports shown, such as elliptical, rectangular, or triangular.

One other way for the frame to be joined to the base that is generally feasible but not usually preferred, is for the base to be molded on a frame fastener portion. However, this may not be the best technique if a high quality surface finish on the frame is to be preserved.

As explained, a range of hood slopes can be accommodated by choosing a certain angle for the base stem. A desired degree of front to back angularity can also be provided by forming a frame emblem support and a chosen angle relative to the frame fastener portion that joins with the base. However, feasibility and expedience in forming the parts plus shipping and handling presently indicates preference to have a frame that is substantially all in one plane with hood slopes taken care of by the shape of the base.

As explained previously, a bonded assembly may be removed by cutting through the adhesive layer 21 (with a knife or lubricated wire) and then removing residual adhesive from the vehicle surface. The latter is facilitated by use of a Scotchbrite brand prorous a brasive disc, that is attached to an electric hand drill. Removal may also include softening the bonded adhesive 21 by injection of a commercial adhesive remover.

Attachment of assemblies to a vehicle or other surface can be intentionally for temporary purposes, such as to display a team symbol on game day. One way to achieve that is to make the base easily removed such as by having an adhesive that yields easily. Another option is to have a relatively permanently mounted assembly, with any chosen primary emblem, with a clip-on secondary emblem that can be clipped on the frame over the primary emblem and removed easily when its purpose has been served.

In addition to its other advantages, the assembly can be made so it presents a low risk of causing serious injury if the assembly is on a vehicle in a collision with a pedestrian. The elasticity of the base allows easy deflection with little force and return to the original position.

Another option is to have a base 14 of a unitary body as described but with a foot 18 and stem 22 of different Shore hardness or elasticity. For example, if desired, the stem may be softer than the foot if that provides more favorable flexing.

Numerous additional variations may be implemented in accordance with the broader aspects of the present invention. Further description of examples of the invention may be found in the above-mentioned provisional application which is hereby incorporated by reference for such description.

What is claimed is:

1. An emblem mounting assembly comprising:

a base including a unitary body of an elastomeric material having a foot portion configured with a mounting surface and a stem portion extending from the foot portion away from the mounting surface, said mounting surface having a layer of adhesive material thereon;

a frame including a support for an emblem and a fastener portion which fits within the stem portion of the base and is securely engaged therewith, none of the base and frame extending beyond the mounting surface of the foot portion.

2. The assembly of claim 1 wherein:

the base stem portion has a substantially cylindrical passage in which the fastener portion of the frame fits.

3. The assembly of claim 2 wherein:

the base stem portion passage has a threaded metal insert therein and the frame fastener portion has threads for mating engagement with the metal insert.

4. The assembly of claim 2 wherein:

the base stem portion is at a predetermined angle from normal to the foot portion, said angle being such as to result in the emblem support being substantially upright when the mounting surface is bonded by the layer of adhesive material to an object surface having a slope.

5. The assembly of claim 1 wherein:

the base stem portion is at a fixed angle from normal to the foot portion.

6. The assembly of claim 1 wherein:

the base foot portion mounting surface extends continuously under the entirety of the base.

7. The assembly of claim 1 wherein:

the base foot portion mounting surface extends over only a periphery of the base with an opening to the base stem portion.

8. The assembly of claim 1 wherein:

the base foot portion mounting surface is divided.

9. An emblem mounting assembly for installation on a vehicle surface comprising:

a base of a flexible body with a foot portion adhesively bondable to the vehicle surface, no part of the assembly penetrating through the vehicle surface, a stem portion of the base extending from the foot portion away from the mounting surface at a predetermined angle thereto; and a frame for supporting an emblem and having a fastener portion joined securely and nonadjustably with the base stem portion, said frame and its fastener portion consisting essentially of material that is nonelastic compared to the base body.

10. The assembly of claim 9 wherein:

the vehicle surface is a hood and the predetermined angle of the base stem is selected to result in a substantially upright orientation of the emblem when the assembly is mounted.

11. The assembly of claim 10 wherein:

the predetermined angle is in the range of about 5° to about 25° from normal to the foot portion surface for bonding on a hood to compensate for the vehicle hood slope.

12. The assembly of claim 9 wherein:

the base flexible body consists essentially of an elastomeric material.

13. The assembly of claim 12 wherein:

the elastomeric material comprises a member at the group consisting of urethane materials and thermoplastic rubber materials.

14. The assembly of claim 13 wherein:

the elastomeric material has an elasticity of at least about 300% without permanent deformation, a tensile strength of at least about 1800 pounds per square inch, and is substantially stable at temperatures in a range of at least about −30° to about +120° F.

15. The assembly of claim 13 wherein:

the base body is adhesively bondable to the vehicle surface by a layer of a foam acrylic adhesive.

16. The assembly of claim 12 wherein:

the foot portion of the body of elastomeric material is smooth and is relatively short in vertical dimension relative to the base stem, and the stem extends up to a distance of no more than about one and one-half inch from the adhesively bondable surface.

17. The assembly of claim 9 wherein:

the frame and its fastener portion are of metal and the fastener portion is joined with the base stem by threads.

* * * * *